Feb. 11, 1958 A. S. WASNIEWSKI ET AL 2,822,573
METHOD AND APPARATUS FOR PRODUCING FOAM RUBBER
SLABS OR CONTOURED PADS
Filed Jan. 17, 1955 2 Sheets-Sheet 1

INVENTORS
ADAM S. WASNIEWSKI
RUSSELL L. MAINS
BY
Whittemore,
Hulbert & Belknap ATTORNEYS

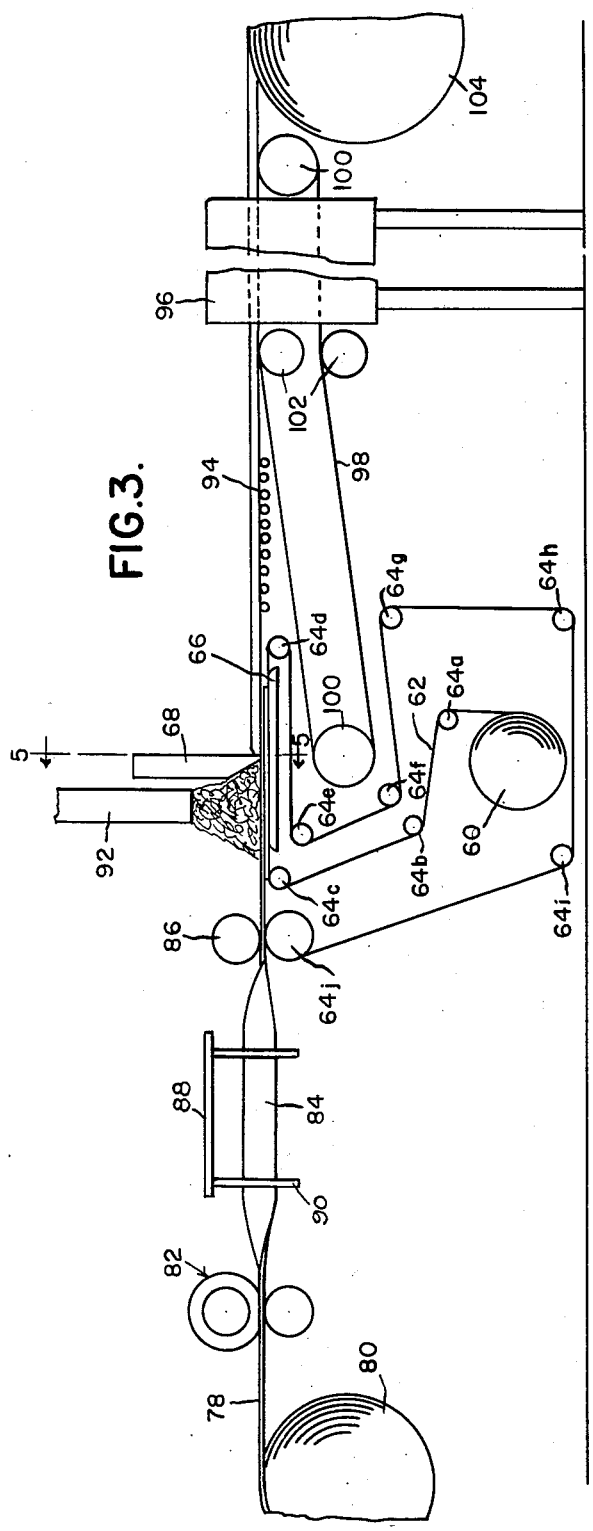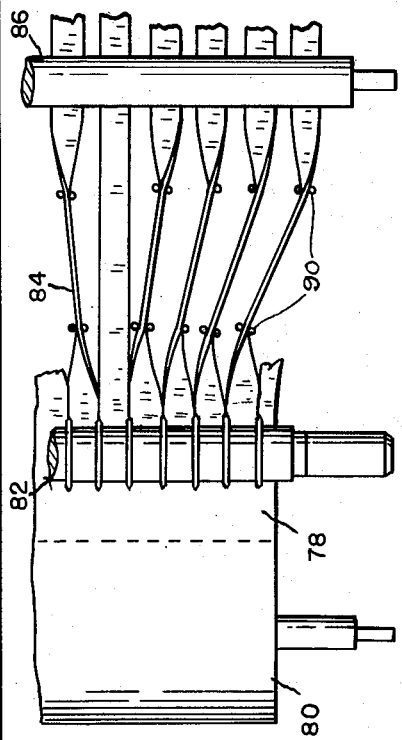

United States Patent Office 2,822,573
Patented Feb. 11, 1958

2,822,573

METHOD AND APPARATUS FOR PRODUCING FOAM RUBBER SLABS OR CONTOURED PADS

Adam S. Wasniewski, Trenton, and Russell L. Mains, Bordentown, N. J., assignors to National Automotive Fibres, Inc., Detroit, Mich., a corporation of Delaware Application January 17, 1955, Serial No. 482,228

11 Claims. (Cl. 18—4)

The present invention relates to method and apparatus for producing foam rubber slabs or contoured pads.

It is an object of the present invention to provide a method and apparatus for carrying out the method characterized in the leading of a continuously advancing flexible porous backing web twice over the upper surface of a gauging plate, depositing uncured foam rubber on the upper ply of the web, and doctoring the foam rubber with a doctor blade to desired thickness and contour as the web advances.

It is a further object of the present invention to provide a method and apparatus for carrying out the method as described in the preceding paragraph which comprises subjecting the doctored uncured foam rubber to elevated temperatures immediately after passage beneath the doctor blade to set, gel and/or initiate the cure of the foam rubber so as to maintain the desired contour.

It is a further object of the present invention to provide a method and apparatus for carrying out the method as described in the preceding paragraphs which includes the continuous introduction of laterally spaced longitudinally extending displacement elements onto the upper surface of the upper ply of the flexible web as it advances, and depositing the uncured foam rubber so as to cover and engage opposite sides of the displacement elements to a substantial depth.

Other objects and features of the invention will become apparent as the description proceeds, especially when taken in conjunction with the accompanying drawings, wherein:

Figure 3 is a fragmentary side elevation of somewhat modified apparatus including means for introducing displacement elements into the foam rubber.

Figure 4 is an enlarged plan view of the apparatus for slitting, twisting and spreading the displacement elements.

The present invention relates generally to the production of foam rubber slabs or pads. For many uses the quality of the pad is dependent largely upon the softness thereof. Other things being equal, the softest foam rubber pads are produced from substantially pure latex foam having a minimum of fillers. Such substantially pure latex is of course the most expensive, since the bulk is substantially increased by adding relatively inexpensive fillers to latex.

It has ben found that foam rubber pads exhibiting substantially the same softness as that obtained from the best quality substantially pure latex may be produced from relatively inexpensive, dense, highly filled foam rubber by including displacement elements in the foam rubber prior to curing. If these displacement elements are substantially softer than the product produced by curing the highly filled foam rubber, the pad resulting from the inclusion of such displacement elements is of course softer than it would otherwise be. It is not necessary for the displacement elements to exhibit substantial softness however, since they may be primarily considered as collapsible elements included in the product for the purpose of shaping supporting legs, struts, or the like of the foam rubber intermediate the displacement elements.

The invention is also concerned with the production of slabs or contoured pads of accurately predetermined and uniform thickness and shape.

Figure 1:
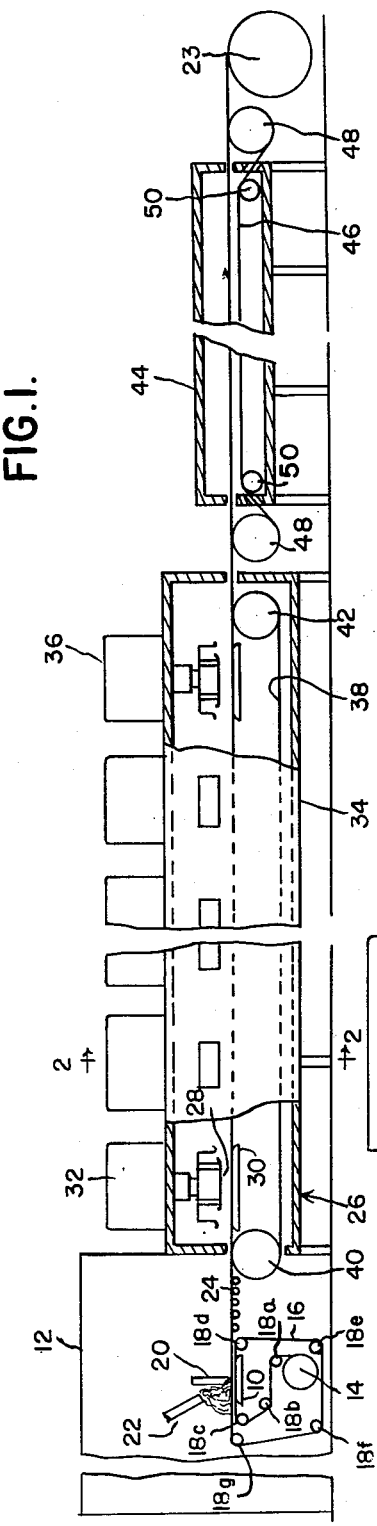
Figure 1 is a diagrammatic elevational view partly in section, illustrating the apparatus for carrying out the method of the present invention.
Figure 2:
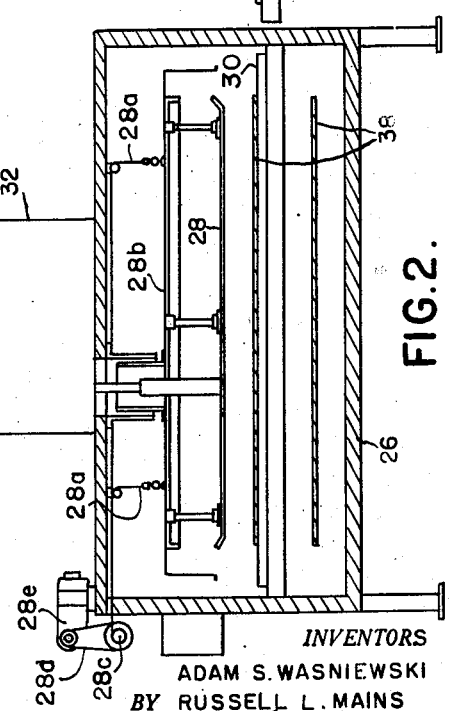
Figure 2 is an enlarged section on the line 2—2, Figure 1.

Referring now to the drawings, in Figures 1 and 2 there is illustrated apparatus including a gauge plate 10 located in a shielded pour room diagrammatically indicated at 12. A supply in the form of a roll of flexible backing material is indicated at 14. The backing material is intended to become a permanent part of the slab or pad and exhibits some porosity so that when the foam rubber in uncured condition is applied thereto, and particularly is pressed against a surface of the backing material by the doctor blade, some of the foam is caused to penetrate the pores or openings in the backing material. For the intended purpose a woven fabric backing material is ordinarily employed.

The backing material indicated at 16 is led around a series of guide rollers 18a, 18b, 18c, 18d, 18e, 18f, and 18g. It will be observed that from the roll 14 the material 16 is led over rollers 18a, 18b and 18c and thence over the smooth upper surface of the gauge plate 10 in direct sliding contract therewith to guide roller 18d. From this guide roller the backing fabric follows around rollers 18e, 18f and 18g, and thence over the upper surface of the gauge plate 10. The roller 18g is in position such that the upper ply of the backing fabric passes in contact with the lower ply across the upper surface of the gauge plate 10. A doctor blade 20 is provided above the gauge plate 10, this doctor blade being vertically adjustable by conventional means and having its lower edge shaped to the required contour of the foam rubber slab or pad. Immediately in front of the doctor blade 20 is provided means 22 for depositing foamed rubber or latex directly from a machine for foaming the material.

The single ply of backing fabric with the gauged and contoured deposit of foam rubber thereon advances through gelling, preheating and curing ovens and may if desired be wound up on rollers indicated at 23 or otherwise stored.

By causing the woven fabric backing material to advance in a double ply across the upper surface of the gauge plate a number of valuable results are obtained. In the first place the deposit of foam rubber on the upper ply of the backing material is accurately gauged as to thickness and contour by the doctor blade. Inasmuch as the thickness of the composite pad will be determined by the spacing between the doctor blade and the lower continuous ply of backing material, this may be very accurately controlled, which would not be the case if the doctor blade were positioned above a conveyor belt over which the backing material was advanced. In the latter case splices, variations in thickness, and other irregularities of the conveyor belt would appear as variations in thickness and irregularities in the completed product.

In the second place, by employing a double thickness over the backing material of the gauge plate the foam rubber is permitted to penetrate through pores and openings in the backing material even to the extent where some of the sponge rubber is located on the underside of the upper ply of the backing material. In the final curing operation, when the foam rubber is cured the backing material is thus mechanically attached to the underside of the foam rubber pad or slab. At the same time the pressure of two plies of the backing material over the gauge plate prevents the uncured foam rubber from penetrating to the smooth upper gauging surface of the gauge plate. The gauge plate is thus kept clean and in condition to cooperate with the doctor blade to insure substantially perfect uniformity of thickness and contour of the finished products.

Inasmuch as it is highly desirable to maintain the exact thickness and contour of the foam rubber as determined by the doctor blade, means are provided in the present instance for effecting substantially immediate gelling or initiation of curing after the material has advanced beyond the doctor blade. For this purpose the backing material with the deposit of foam rubber thereon is immediately passed over and in direct sliding contact with the upper surface of heating elements indicated at 24. These heating elements in the present instance are illustrated as steam pipes but other types of heating elements could of course be employed. The important factor is the heating of the foam rubber with a minimum of delay after it has passed the doctor blade 20.

Immediately beyond the heating elements 24 there is provided a gelling oven indicated generally at 26 including dielectric heating means including electrodes 28 and bed plates 30 over which the backing material together with the uncured foam rubber passes. A high frequency alternating field is set up between the electrodes and bed plates by means of oscillators indicated generally at 32. By this means the entire mass of foam rubber is subjected to very quick heating to bring about gelling. Suitable lifting mechanism including cables 28a connected to the supporting frame 28b for the electrode 28 and wound upon a rotatable drum 28c driven by a belt 28d from an electric motor 28e may be used to raise and lower the electrode 28 relative to the bed plate 30. Located next beyond the gelling oven 26 is a combined preheating and curing oven 34 which includes dielectric heaters indicated generally at 36 of the type illustrated in the gelling oven. It is also contemplated however, that in the preheating and curing oven, the material will be subjected to the combined action of the dielectric heaters and ambient atmosphere of elevated temperature, either hot air or steam. The backing material together with the foam rubber deposited thereon is supported during its passage through the gelling oven 26 and the preheating and curing oven 34 on a conveyor belt indicated generally at 38 supported on end rollers 40 and 42. This conveyor belt may conveniently be formed of neoprene.

Finally, the gelled preheated and partially cured foam rubber on the backing material is advanced into the curing oven 44 where its cure is completed by subjecting it to an ambient atmosphere of elevated temperature, either steam or hot air. At this time it is desirable to subject both the top as well as the bottom of the product to the heated atmosphere, and for this purpose the material is supported on a foraminous conveyor belt 46 which may for example be a wire mesh belt supported on end rollers 48 and intermediate rollers 50.

Figure 5:
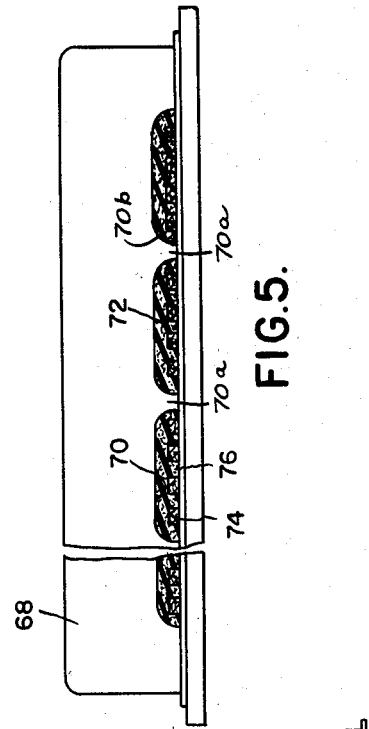
Figure 5 is a fragmentary enlarged sectional view on the line 5—5, Figure 3.

Referring now to Figures 3 and 4 there is illustrated apparatus which in part is similar to that previously described but which is modified by the inclusion of means to enable the production of elongated slabs or contoured pads, such as illustrated in Figure 5. In these figures a roll 60 of backing material 62, which may be a somewhat porous woven fabric, is supported and the backing material is led around rollers 64a, 64b, 64c, 64d, 64e, 64f, 64g, 64h, 64i, and 64j to provide a double ply of uniformly and continuously advancing backing material over a stationary gauge plate 66. Located at a predetermined elevation above the gauge plate 66 is a doctor blade 68 which as indicated in Figure 5 may have a plurality of upwardly extending elongated recesses 70 and intermediate leg portions 70a of predetermined contour to transform the mass of foam rubber into a longitudinally extending slab of predetermined thickness and contour having transversely spaced longitudinally extending riser portions 72 and upwardly opening longitudinally extending grooves 70b between said riser portions of the shape shown in the figure.

In Figure 5 it will be noted that the riser portions 72 include the elongated laterally spaced displacement elements 74. These elements may be formed of a highly compressible very soft material so that the overall softness of the slabs or pads may be largely determined by the compressibility of the laterally spaced depending legs or ribs 76 formed between said elements. Alternatively, the displacement elements 74 may be of a material whose initial resistance to compression may be greater than that of the cured foam rubber in which the elements are embedded. In this case the elements are substantially collapsible so that after initial compression or collapse, they do not provide any appreciable support for the upper portion of the pad or slab. At the same time they do not prevent restoration of the shape of the pad after compression by the inherent resilience of the pad material.

The displacement elements 74 may conveniently be cut from a continuous blanket 78 provided in a roll 80 and passed beneath portions of a slitter indicated at 82 to cut the material into strips as indicated at 84 in Figure 4. The strips 84 pass from the slitter over the roller 64j and between this roller and an upper roller 86. In order to separate the strips 84 and to guide them into the required position in the finished product, a twisting and spreading frame 88 is provided having depending legs 90 to guide and twist the strips, as well illustrated in Figures 3 and 4.

It will be observed that the relative thickness and width of the strips 84 as seen in Figures 3 and 4, differs substantially from that shown in Figure 5. This is intended to illustrate that the exact cross-sectional shape and arrangement of the strips which form the displacement elements may be widely varied in accordance with the results desired.

The rollers 64j and 86 guide the strips in properly laterally spaced relation onto the upper ply of the backing fabric 62 where it passes over the gauge plate 66. At this point and directly in front of the doctor blade 68, means 92 are provided for depositing foamed rubber or latex to cover the displacement elements. The deposit of the foamed rubber or latex is doctored by passage of the upper ply of the backing material to the required thickness and contour, for example, that suggested in Figure 5. It will be appreciated in this case that the continuous elongated displacement elements are supported in the relatively light foam rubber or latex. It is also to be recognized that the displacement elements may exhibit certain tendencies to shift and it is therefore highly desirable, in order to retain them in exactly preplaced condition and also to maintain thickness and contour of the foam rubber slabs or pads, to effect quick gelling or initiation of cure immediately after doctoring. For this purpose heating elements indicated at 94 which may be in the form of steam pipes or other types of direct heating elements, are provided as closely as possible adjacent the doctor blade. The single ply of backing material with the foam rubber deposited thereon and with the elongated displacement elements embedded in the foam rubber is advanced over the heating elements 94 in direct contact therewith. This has the effect of setting the final product so that it will maintain with a high degree of accuracy its gauged thickness and contour and will maintain the displacement elements in the precise arrangement in which they are guided onto the backing fabric. The final curing operation is carried out in an elongated curing oven indicated diagrammatically at 96, which may be of any desired or suitable type. The product is guided through the curing oven on a conveyor belt indicated at 98 passing over end rolls 100 and intermediate guide rolls some of which are indicated at 102. If desired, the finished cured material may be wound up in roll form as indicated at 104, or it may be otherwise stored or disposed of.

The use of the double thickness of the somewhat porous backing material as it passes over the upper surface of the gauge plate 66 is to permit some of the uncured foam rubber to be forced through the pores or interstices of the upper ply so that in the finished product the backing material will be mechanically attached to and in a sense slightly embedded in the lower surface of the foam rubber. At the same time, it will be recalled that the displacement elements are initially deposited directly on the upper surface of the upper ply of backing material. Accordingly, as the composite uncured product is passed over the heating elements 94, the under-surface is exposed to maximum quick heating with the result that the material will be set and will maintain the displacement elements locked in position between the bottom backing fabric and the overlying and surrounding volume of foam rubber. As in the previously described embodiment of the invention, continued curing is effected continuously and rapidly so as to produce a finished product having substantially the identical gauged thickness and contour resulting from its passage beneath the doctor blade 68.

The drawings and the foregoing specification constitute a description of the improved method and apparatus for producing foam rubber slabs or contoured pads in such full, clear, concise and exact terms as to enable any person skilled in the art to practice the invention, the scope of which is indicated by the appended claims.

What we claim as our invention is:

1. The method of making a slab of foam rubber having a backing of porous material which comprises advancing a closed loop of the material in sliding contact over a gauge plate to provide a double ply of material thereover, depositing uncured foam rubber to the upper ply of material over said gauge plate, doctoring the foam rubber to required thickness and contour over the plate and thereby forcing some foam rubber through the upper ply, advancing the upper ply away from the lower ply and curing the foam rubber, and advancing the lower ply in the closed loop to position over said plate where it becomes the upper ply.

2. The method of making a slab of foam rubber having a backing of porous material which comprises advancing a closed loop of the material in sliding contact over a gauge plate to provide a double ply of material thereover, depositing uncured foam rubber to the upper ply of material over said gauge plate, doctoring the foam rubber to required thickness and contour over the plate and thereby forcing some foam rubber through the upper ply, advancing the upper ply away from the lower ply into immediate direct contact with heating means to initiate quick setting of the foam rubber to preserve its contour.

3. The method of making a foam rubber slab having a backing of porous backing material which comprises disposing a continuous web of the material in a closed loop to provide a double ply of material, supporting the double ply while advancing the web, depositing uncured foam rubber on the upper ply, guiding the upper ply away from the lower ply, and curing the foam rubber on the upper ply during its continued advance.

4. The method of making a foam rubber slab having a backing of porous backing material which comprises disposing a continuous web of the material in a closed loop to provide a double ply of material, supporting the double ply while advancing the web, depositing uncured foam rubber on the upper ply, doctoring the foam rubber to desired thickness and contour against the upper surface of the double ply, guiding the upper ply away from the lower ply, and curing the foam rubber on the upper ply during its continued advance.

5. The method of making a foam rubber slab having a backing of porous backing material which comprises disposing a continuous web of the material in a closed loop to provide a double ply of material, supporting the double ply while advancing the web, guiding laterally spaced strips of collapsible displacement material onto the upper ply for further advance therewith, depositing uncured foam rubber on the upper ply, guiding the upper ply away from the lower ply, and curing the foam rubber on the upper ply during its continued advance.

6. The method of making a foam rubber slab having a backing of porous backing material which comprises disposing a continuous web of the material in a closed loop to provide a double ply of material, supporting the double ply while advancing the web, guiding laterally spaced strips of collapsible displacement material onto the upper ply for further advance therewith, depositing uncured foam rubber on the upper ply, doctoring the foam rubber to desired thickness and contour against the upper surface of the double ply, guiding the upper ply away from the lower ply, and curing the foam rubber on the upper ply during its continued advance.

7. The method of making a foam rubber slab having a backing of porous backing material which comprises disposing a continuous web of the material in a closed loop to provide a double ply of material, supporting the double ply while advancing the web, guiding laterally spaced strips of collapsible displacement material onto the upper ply for further advance therewith, depositing uncured foam rubber on the upper ply, doctoring the foam rubber to desired thickness and contour against the upper surface of the double ply, guiding the upper ply away from the lower ply, and quickly heating the foam rubber immediately after doctoring to preserve the contour and position of the strips therein.

8. Apparatus for making foam rubber slabs or pads comprising a gauge plate, rollers for guiding a web of backing material in a closed loop twice over said plate to provide a double thickness of web thereat, a doctor blade over said plate, means for depositing uncured foam rubber on the upper ply of web over said plate, and heating means for initiating setting of the foam rubber immediately after passage beneath said doctor blade.

9. Apparatus for making foam rubber slabs or pads comprising a gauge plate, rollers for guiding a web of backing material in a closed loop twice over said plate to provide a double thickness of web thereat, a doctor blade over said plate, means for depositing uncured foam rubber on the upper ply of web over said plate, and heating means adjacent said blade over which said web is advanced immediately after passage beneath said doctor blade.

10. Apparatus for making foam rubber slabs or pads comprising a gauge plate, rollers for guiding a web of backing material in a closed loop twice over said plate to provide a double thickness of web thereat, a doctor blade over said plate, means for depositing uncured foam rubber on the upper ply of web over said plate, and heating elements adjacent said blade over which said web is advanced in direct contact therewith immediately after passage beneath said doctor blade.

11. Apparatus for making foam rubber slabs or pads comprising a gauge plate, rollers for guiding a web of backing material in a closed loop twice over said plate to provide a double thickness of web thereat, means for advancing laterally spaced strips of collapsible displacement material into contact with the upper ply of said web over said plate, a doctor blade over said plate, means for depositing uncured foam rubber on the upper ply of web over said plate, and heating means for initiating setting of the foam rubber immediately after passage beneath said doctor blade.

(References on following page)

References Cited in the file of this patent

UNITED STATES PATENTS

| | | |
|---|---|---|
| 1,447,413 | Dunn | Mar. 6, 1923 |
| 1,931,333 | Taylor | Oct. 17, 1933 |
| 2,066,596 | West | Jan. 5, 1937 |
| 2,271,058 | Binns | Jan. 27, 1942 |
| 2,441,235 | Blair et al. | May 11, 1948 |
| 2,586,275 | Toulmin | Feb. 19, 1952 |
| 2,595,964 | Lovell | May 6, 1952 |
| 2,623,239 | Fischbein | Dec. 30, 1952 |
| 2,641,296 | Marco | June 9, 1953 |
| 2,648,619 | Alderfer | Aug. 11, 1953 |
| 2,703,909 | Harwin et al. | Mar. 15, 1955 |